United States Patent [19]

Barsa

[11] Patent Number: 4,632,785
[45] Date of Patent: Dec. 30, 1986

[54] THERMALLY ACTIVABLE TRIMERIZATION CATALYST

[75] Inventor: Edward A. Barsa, Cheshire, Conn.

[73] Assignee: The Dow Chemical Company, Midland, Mich.

[21] Appl. No.: 750,634

[22] Filed: Jul. 1, 1985

Related U.S. Application Data

[62] Division of Ser. No. 522,127, Aug. 11, 1983, Pat. No. 4,540,781.

[51] Int. Cl.$^4$ .............................................. C07C 87/30
[52] U.S. Cl. ............................... 260/501.15; 560/146; 560/190
[58] Field of Search ................... 260/501.15; 560/146, 560/190

[56] References Cited

U.S. PATENT DOCUMENTS

| | | | |
|---|---|---|---|
| 3,954,684 | 5/1976 | Farrissey et al. | 521/902 |
| 3,980,594 | 9/1976 | Fabris et al. | 521/902 |
| 4,040,992 | 8/1977 | Bechara et al. | 260/501.15 |
| 4,136,240 | 1/1979 | Zimmerman et al. | 260/501.15 |
| 4,186,255 | 1/1980 | Klein et al. | 521/902 |

FOREIGN PATENT DOCUMENTS

| | | | |
|---|---|---|---|
| 908337 | 10/1962 | United Kingdom. | |
| 1426299 | 2/1976 | United Kingdom | 260/501.15 |

*Primary Examiner*—J. E. Evans
*Attorney, Agent, or Firm*—James S. Rose

[57] ABSTRACT

Disclosed is a method for the trimerization of organic isocyanates comprising thermally activating, in the presence of said isocyanates, a catalyst comprising a carboxylic acid salt selected from the alkali metal salts or quaternary ammonium salts of particular substituted malonic acids of half-esters thereof, particular carbamyl substituted aliphatic acids, or triaryl acetic acids.

Mixtures of the catalysts with isocyanates have surprisingly long periods of stability at ambient temperatures (about 20° C.) which makes the present method particularly suitable to systems for molding polyisocyanurates wherein long open times are required of a resin pre-mix prior to the actual curing step.

8 Claims, No Drawings

THERMALLY ACTIVABLE TRIMERIZATION CATALYST

This application is a division of application Ser. No. 522,127 filed Aug. 11, 1983 now U.S. Pat. No. 4,540,781.

BACKGROUND OF THE INVENTION

1. Field of the Invention

This invention relates to a process for polymerizing organic isocyanates and is more particularly concerned with a process for trimerizing isocyanates in the presence of thermally activable catalysts and with novel catalysts therefor.

2. Description of the Prior Art

The polymerization of organic isocyanates and particularly polyisocyanates to form either cellular or solid polyisocyanurates is well known in the art. A large number and variety of trimerization catalysts have been disclosed in the prior art; see for example Saunders and Frisch Polyurethanes: Chemistry and Technology Part I, 1962, p 212, Interscience Publishers, New York, N.Y.

Quaternary ammonium salts and alkali metal salts of organic carboxylic acids have long been recognized as isocyanate trimerization catalysts. British Pat. No. 908,337 discloses both types of catalysts. U.S. Pat. No. 3,980,594 discloses particularly active quaternary ammonium salts.

U.S. Pat. No. 3,954,684 discloses effective trimerization catalyst combinations of tertiary amines with particular quaternary ammonium salts. Bis-quaternary ammonium salts have been disclosed as polyisocyanurate forming catalysts in U.S. Pat. No. 4,186,255.

In the art of isocyanate trimerization there has always been a need for delayed action or thermally activable catalysts. Generally speaking, the prior art catalysts are not useful in this regard because their properties have been directed at the opposite end of the scale, that is initiating the trimerization reaction at as low a temperature as possible.

It has now been discovered that a certain class of carboxylic acid salts, some of which are believed to be novel compounds, behave as thermally activable catalysts for trimerizing organic isocyanates. In contrast to prior art catalysts of the type referred to hereinbefore, the present catalysts can be premixed with the isocyanates at ambient temperature (about 20° C.), and, in the absence of heat, are stable as such for literally hours before polymerization of the isocyanate initiates.

SUMMARY OF THE INVENTION

This invention comprises a method for the trimerization of an organic isocyanate comprising thermally activating in the presence of said isocyanate a catalyst comprising a carboxylic acid salt selected from the group consisting of the following formulae:

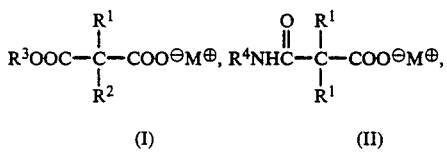

wherein $R^1$ in (I) is alkyl having 2 to 8 carbon atoms, inclusive, and each $R^1$ in (II) is independently selected from alkyl having 2 to 8 carbon atoms, inclusive, $R^2$ is a highly branched alkyl having 3 to 8 carbon atoms, inclusive, $R^3$ is selected from the group consisting of hydrogen, alkyl, and aryl, $R^4$ is selected from the group consisting of alkyl, aryl, aralkyl, and cycloalkyl, each $R^5$ is independently selected from aryl, and $M^\oplus$ is a cation selected from the group consisting of alkali metal cations and quaternary ammonium cations having the formula $^\oplus N(R^6)_4$ wherein each one of the four $R^6$ radicals is independently selected from the group consisting of alkyl, aralkyl, cycloalkyl, and radicals having the formula $$(CH_2-CHO)_n H \atop R^7 \qquad (IV)$$

wherein $R^7$ is selected from the group consisting of hydrogen and methyl and n is a number of from 1 to 4 provided that no more than one $R^6$ radical has the formula (IV).

This invention also comprises thermally activable organic isocyanate trimerization catalysts comprising carboxylic acid salts selected from the salts (I), (II), and (III) above wherein $M^\oplus$ has the formulae $^\oplus N(R^6)_4$ and designated (Ia), (IIa), and (IIIa) respectively and $R^6$ is defined above.

Illustrative of the term "alkyl having 2 to 8 carbon atoms", inclusive, are ethyl, propyl, butyl, pentyl, hexyl, heptyl, octyl, and isomeric forms thereof.

The term "highly branched alkyl having 3 to 8 carbon atoms" means an alkyl radical in which the valency bond is attached to a secondary carbon atom of said radical, such as isopropyl, isobutyl, 1-ethylpropyl, 1-methylbutyl, 1-methylpentyl, 1-ethylbutyl, 1-ethylpentyl, 1-methylhexyl, 1-methylheptyl, 1-ethylhexyl, 2-methylpropyl, 2-methylbutyl, 2-methylpentyl, 2-methylhexyl, 2-methylheptyl, 2-ethylbutyl, 2-ethylpentyl, 2-ethylhexyl, and the like.

The term "alkyl" has the same meaning as alkyl having 2 to 8 carbon atoms set forth above but also including 1 carbon atom, i.e. methyl.

The term "aryl" means the radical obtained by removing one nuclear hydrogen atom from an aromatic hydrocarbon having 6 to 10 carbon atoms, and is inclusive of phenyl, tolyl, xylyl, naphthyl, and the like.

The term "aralkyl" means the monovalent radical obtained by removing one hydrogen atom from the alkyl portion of an aromatic alkane hydrocarbon having 7 to 18 carbon atoms, such as benzyl, phenethyl, phenylpropyl, benzhydryl, naphthylmethyl, and the like.

The term "cycloalkyl" means cycloalkyl having 4 to 6 ring carbon atoms, inclusive, such as cyclobutyl, cyclopentyl, cyclohexyl, and the like.

The term "alkali metal cation" means $Na^+$, $K^+$, and $Li^+$.

DETAILED DESCRIPTION OF THE INVENTION

Generally speaking, there are many types of systems involving the trimerization of organic isocyanates, particularly polyisocyanates, and, more particularly, aromatic polyisocyanates which can be employed in the process in accordance with the present invention. Typical, but not limiting thereof, are the systems for formation of polyisocyanurates per se, polyisocyanurate-polycarbdiimides, polyisocyanurate-polyurethanes, polyisocyanurate-polyurethanes-polyureas, polyisocyanurate-polyamide-polyurethanes, etc. That is to say that, in addition to the trimerization process in accordance with the present invention, other polymer forming ingredients or catalysts can be present to form the corresponding copolymers. For example, carbodiimide-forming catalysts and/or carbodiimide-containing polyisocyanates can be employed in combination with the present process. Organic polyols can be included in the present process to form polyisocyanurate-polyurethanes. Amine extenders can be included to form the polyurea linkages. And ketene-aminal reactants can be included with polyols to form the polyisocyanurate-polyamide-polyurethanes. For illustrative and detailed teaching in regard to the preparation of the above types of polyisocyanate based polymer systems including reactants and preparative procedures, reference is made to U.S. Pat. Nos. 2,993,870; 3,657,161; 3,896,052; 3,899,443; 3,903,018; 4,296,212 and 4,342,841 whose disclosures relative thereto are hereby incorporated herein by reference.

Generally speaking, when preparing polyisocyanurates in accordance with the present process, in the absence of other catalysts and polymer forming ingredients such as polyols, a minor amount of polycarbodiimide formation takes place. The actual amount, or absence thereof, of carbodiimide formation depends largely on the activation temperature employed but, more importantly, on the presence or absence of other reactants for the isocyanate. When other polymer forming ingredients are present such as organic polyols to form the polyurethanes, then carbodiimide formation is minimal and sometimes cannot be observed at all.

In carrying out the process in accordance with the present invention, it will be understood by those skilled in the art that it is not limited to the preparation of non-cellular solid products but can also be used in the preparation of cellular products. However, it is in the preparation of the former products wherein the greatest utility resides because of the thermally activable nature of the catalyst. The isocyanate and catalyst can be premixed together with other components and handled as a one-component system which can be stored, pumped, cast, used to impregnate other materials, etc., and then thermally activated to cure quickly to the finished polymerized state.

Accordingly, the present process can be employed in the preparation of solid polyisocyanurates and related copolymers by such methods as casting or molding, see U.S Pat. No. 4,251,428 whose disclosure relative to casting is hereby incorporated herein by reference; by resin transfer molding (RTM), see Reinforcement Role in the Resin Transfer Molding Process and Comparison with Other Competitive Processes by S. Bernardini, pp 1 to 6 Section 15F, SPI pre-prints, 35th Annual Technical Conference 1980, Reinforced Plastics Composite Institute, SPI whose disclosure relative to RTM is hereby incorporated herein by reference; by pultrusion which involves resin-impregnated strands of roving pulled through an orifice of a die, and then through a heating chamber to cure the resin, see Process and Economic Factors for Pultrusion by J. A. Rolston, pp 1 to 5 Section 8G, Technical Proceedings 33rd Annual Conference Reinforced Plastics, February 1978, SPI whose disclosure relative to pultrusion procedures is hereby incorporated herein by reference; by thermoset injection molding of the reactants in accordance with the present process in the form of either liquids, solids, or low molecular weight powders, see U.S. Pat. No. 4,119,594 whose disclosure relative to thermoset injection molding is hereby incorporated herein by reference; by bulk or sheet molding methods (BMC and SMC), see U.S. Pat. No. 4,250,292 and Modern Plastics, January 1980, pp 56 to 59 whose disclosure relative to BMC and SMC procedures are hereby incorporated herein by reference; and by reaction injection molding (RIM) procedures particularly in combination with known prior art catalysts and other ingredients, see U.S. Pat. Nos. 4,218,543 and 4,321,333 whose disclosures relative thereto are hereby incorporated herein by reference.

The novelty in the present invention resides in the thermal activation of the carboxylic acid salt trimerization catalysts (I), (II), or (III) defined above in combination with the organic isocyanate to be trimerized.

Preferably, the thermally activable trimerization catalysts for use in the present process are the novel compounds having the formulae (Ia), (IIa), and (IIIa) defined above and most preferred within this group are the salts defined by formula (IIa).

In respect of the radicals $R^1$ preferred is alkyl having 2 to 4 carbon atoms.

In respect of $R^2$ preferred is isoalkyl having 3 to 4 carbon atoms.

In respect of $R^3$ alkyl is preferred over hydrogen and aryl with alkyl of 1 to 4 carbon atoms being preferred for the alkyl radical.

In respect of $R^4$ aryl is the preferred radical class.

In respect of $R^5$ phenyl is the preferred radical.

In respect of $M^\oplus$, the quaternary ammonium cations otherwise identified $^\oplus N(R^6)_4$ herein are preferred as a class with alkyl and aralkyl radicals being preferred for $R^6$ within this class.

Illustrative of the carboxylic acid salts for use in accordance with the present invention are the following, α-ethyl-α-isopropylmalonic acid mono-sodium salt, α-ethyl-α-isopropylmalonic acid mono-potassium salt, α-ethyl-α-isopropylmalonic acid mono-lithium salt, α-ethyl-α-isopropylmalonic acid mono-tetramethylammonium salt, α-ethyl-α-isopropylmalonic acid mono-tetraethylammonium salt, α-ethyl-α-isopropylmalonic acid monotrimethylbenzylammonium salt, α-ethyl-α-isopropylmalonic acid mono-trimethyl(2-hydroxypropyl)ammonium salt, α-ethyl-α-isobutylmalonic acid mono-potassium salt, α-ethyl-α-isobutylmalonic acid mono-tetramethylammonium salt, α-ethyl-α-isobutylmalonic acid mono-trimethylbenzylammonium salt, α-propyl-α-isobutylmalonic acid monotrimethylbenzylammonium salt, and the like; ethyl α-ethyl-α-isobutylmalonate mono-potassium salt, ethyl α-ethyl-α-isobutylmalonate mono-trimethylbenzylammonium salt, ethyl α-ethyl-α-isobutylmalonate mono-trimethyl(2-hydroxypropyl)ammoniumsalt, butyl α-ethyl-α-isobutylmalonate mono-potassium salt, butyl α-ethyl-α-isobutylmalonate mono-trimethylbenzylammonium salt, butyl α-butyl-α-isopropylmalonate mono-potassium salt, butyl α-butyl-α-isopropylmalonate mono-trimethylbenzylammonium salt, and the like; potassium 2-ethyl-2-[(methylamino)carbonyl]butanoate, trimethylbenzylammonium 2-ethyl-2-[(ethylamino) carbonyl)]butanoate, trimethylbenzylammonium 2-ethyl-2-[(butylamino)carbonyl]butanoate, trimethylbenzylammonium 2-ethyl-2-[(phenylamino)carbonyl]butanoate, tetramethylammonium 2-ethyl-2-[(phenylamino)carbonyl]butanoate, trimethyl(2-hydroxypropyl)ammonium-2-ethyl-2-[(phenylamino)carbonyl]butanoate, trimethylbenzylammonium 2-ethyl-2-[(benzylamino)carbonyl]butanoate, trimethylbenzylammonium 2-ethyl-2-[(phenylamino)carbonyl]hexanoate, trimethylbenzylammonium 2-ethyl-2-[(cyclohexylamino) carbonyl]-butanoate, and the like; sodium triphenylacetate, potassium triphenylacetate, lithium triphenylacetate, tetramethylammonium triphenylacetate, trimethylbenzylammonium triphenylacetate, and the like.

Preferred carboxylic acid salts in accordance with the present invention are α-ethyl-α-isobutylmalonic acid mono-trimethylbenzylammonium salt, ethyl α-ethyl-α-isobutylmalonate mono-trimethylbenzylammonium salt, trimethylbenzylammonium 2-ethyl-2-[phenylamino)carbonyl]butanoate, potassium 2-ethyl-2-[(phenylamino)carbonyl]hexanoate, trimethylbenzylammonium 2-ethyl-2-[(phenylamino)carbonyl]hexanoate, and trimethylbenzylammonium triphenylacetate.

The carboxylic acid salt catalysts can be added to the isocyanate in any convenient manner depending only on the particular application being employed, the presence or absence of other ingredients, and the like. The catalyst can be employed in pure form, or, preferably, diluted with a diluent such as methanol, ethanol, ethylene glycol, diethylene glycol, and the like. The catalyst can be added directly to the isocyanate, or, if preferred, it can be added to the reaction mixed with another ingredient such as an organic polyol, and the like.

Generally speaking, the quantity of catalyst to be employed will vary according to factors such as the activity of a particular isocyanate-catalyst combination and the temperature (discussed below) which one chooses as the activation and/or curing temperature for a given system, that is to say, the temperature at which the isocyanate polymerizes rapidly to the polyisocyanurate. However, the optimum amount is easily determined for any system by a process of trial and error.

Advantageously, the catalyst is employed in an amount falling within a range of from about 0.05 to about 10 mole percent, preferably from about 0.1 to about 2 mole percent per mole of isocyanate being trimerized.

The terms "thermally activating" and "thermally activable" as used herein mean heating above ambient room temperature (about 20° C.) and becoming active above ambient temperature respectively.

Generally speaking, the process in accordance with the present invention is amenable to any elevated temperature which provides reasonably short cure times or reaction rates. Advantageously, the reaction mixture being employed is heated to a temperature falling within a range of from about 50° C. to about 200° C., and, preferably from about 60° C. to about 150° C.

Trimerization catalysts, including those in accordance with the present invention, are characterized by a finite induction period when measured at about 20° C. in the absence of solvents before the trimerization reaction initiates. Additionally, for any given catalyst the rate at which the cure or completion of the trimerization proceeds after initiation will vary. Generally speaking, prior art catalysts have induction times which measure in minutes, for example less than 1 hour and more often about 2 to about 30 minutes.

Contrastingly, catalysts in accordance with the present invention, under the same test conditions (i.e. about 20° C. and in the absence of solvent), have induction times greater than 1 hour.

A very surprising, and most useful, feature of the process in accordance with the present invention is the prolonged stability of the isocyanate-catalyst system at ambient temperatures coupled with the very rapid completion of the trimerization process once the system has been thermally activated. Generally speaking, once the trimerization process initiates, its completion is a matter of seconds to minutes depending on the particular polymer system and on the activation temperature being employed. It is this particular feature that makes the present process so adaptable and useful in the various molding and preparative procedures set forth above.

It will be obvious to one skilled in the art that the catalysts in accordance with the present invention may be employed in systems which call for the use of a solvent. However, in this connection, depending upon the particular solvent employed, the induction times will vary from those values set forth above. The preferred embodiments of the present process are those which are carried out in the absence of solvent.

Both the known and novel carboxylic acid salts to be used in accordance with the present invention are readily obtained using standard preparative methods well known to those skilled in the art. The following schematic equation represents a general preparative procedure wherein a carboxy functional compound (V) is reacted with slightly less than one molar equivalent of a reactant (VI) to produce a carboxylic salt corresponding to any one of formulae (I) through (III) and (Ia) through (IIIa), inclusive

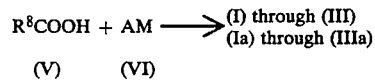

wherein $R^8$ represents the molecular residues of any one of (I) through (III) after removal of the carboxylate moiety, M represents the neutralized forms of the alkali metal cations and quaternary ammonium cations defined above, and A typically represents a neutralized anion such as hydroxyl, hydride, alkoxide, and the like. The reactant (VI) is used in slightly less than molar equivalency to insure that no residual (VI) will remain in the products because these reagents, for the most part, are strong trimerization catalysts in their own right.

When M represents sodium, potassium or lithium and A is hydroxyl then the reaction is a simple neutralization reaction between the base (VI) and acid (V).

Alternatively, sodium, potassium, or lithium alkoxides such as sodium methoxide or ethoxide can be used to neutralize the acid.

Preferably, a quaternary ammonium hydroxide is used to neutralize the acid and this can be typically carried out in alcoholic solution (such as methanol). The neutralization is preferably carried out by adding a solution of the acid to a solution of the quaternary ammonium hydroxide containing an acid-base indicator. The neutralization is taken just to the acid side to insure that no quaternary ammonium hydroxide remains. The solution containing the carboxylic acid salt can be used as such without purification, or alternatively, can be concentrated by known methods to remove solvent from the active ingredient; see U.S. Pat. No. 3,954,684 cited supra for teaching related to the preparation of quaternary ammonium salts and which disclosure is incorporated herein by reference.

In the event that $R^8$ in the reactant (V) is the residue corresponding to (I) in which $R^3$ is hydrogen, then the neutralization is just carried over to the acid side to further insure that the di-salt is not formed. The catalysts in accordance with the present invention while including a free carboxylic acid group in the same carboxylic salt molecule, do not include the di-salt form in the same molecule. The reason for this is the fact that the di-salts do not have the same characteristically delayed onset of the trimerization reaction as the mono salts in accordance with the present invention.

The starting carboxylic acids are, for the most part, commercially available or else known compounds which are easily prepared. The malonic acids, and half-esters, and triaryl acetic acids, corresponding to formulae (I) and (III) are known compounds; for teaching directed to preparation of mono anilides, mono amides, etc. of malonic acids (II) see Acta. Acad. Abo. Math. Phys. 1969, 29(8), 13 (Chem. Abstracts 73, 45407m).

The isocyanates to be used in accordance with the present invention can be any of the organic isocyanates, particularly organic polyisocyanates, and, preferably, aromatic polyisocyanates known to those skilled in the art which are referred to in the patents cited supra.

Typical, but not limiting, of the isocyanates which can be used are phenyl isocyanate, hexamethylene diisocyanate, 4,4'-methylenebis(phenyl isocyanate), m- and p-phenylene diisocyanate, 2,4- and 2,6-toluene diisocyanate and mixtures of the 2,4- and 2,6-isomers, polymethylenepolyphenyl isocyanates, the various types of liquefied methylenebis(phenyl isocyanates) obtained by reacting the methylenebis(phenyl isocyanate) in varying proportions with minor amounts of one or more glycols and the liquid diisocyanates comprising the carbodiimide-containing methylenebis(phenyl isocyanates) having an isocyanate equivalent weight of from about 130 to about 180. Also included within the scope of the present invention are isocyanate terminated polyurethane prepolymers.

Preferred amongst the typical species cited above are the aromatic polyisocyanates.

Any of the polyisocyanates, polyols, difunctional extenders in the references cited supra can be employed in the present process. A preferred process comprises the trimerization of an aromatic polyisocyanate in the presence of an organic polyol.

Other optional additives such as dispersing agents, cell stabilizers, mold release agents, surfactants, flame retardants, colorants, and the like can be added to the trimerization process in accordance with the present invention.

The delayed action of the present catalysts which can be activated at relatively low temperatures makes the present process particularly suitable to those preparative methods which call for the use of one component systems that must be premixed, manipulated, and otherwise handled before the final curing step. This is particularly true in those cases where reinforcing fibers, roving, fiber bundles, mats, etc., must be thoroughly impregnated with a resin system prior to polymerization of the resin. Accordingly, this is why the present process is applicable to BMC, RTM, and pultrusion processes referred to hereinbefore.

Accordingly, the process for making polyisocyanurate articles in accordance with the present invention is useful, inter alia, for the preparation of molded solid cast elastomers, elastoplastics, and the like. Such molded products find particular utility as auto parts such as car bumpers, body elements, panels, doors, engine hoods, skirts, air scoops, and the like. Further, the good high temperature resistance of such polyisocyanurate containing articles makes them eminently suitable where higher than normal temperature resistance is required.

The following examples describe the manner and process of making and using the invention and set forth the best mode contemplated by the inventor of carrying out the invention but are not to be construed as limiting.

EXAMPLE 1

(a) A 50 g. sample of 40 percent by weight of trimethylbenzylammonium hydroxide in methanol was placed in a 250 ml. beaker and a crystal of bromothymol blue indicator dissolved therein.

There was slowly added to the beaker with constant stirring, ethyl α-ethyl-α-isobutylmalonate monocarboxylic acid until the color of the solution just turned to yellow (pH=about 6.0).

Thus there was produced ethyl α-ethyl-α-isobutylmalonate mono trimethylbenzylammonium salt in accordance with the present invention having the following formula in accordance with (Ia) above

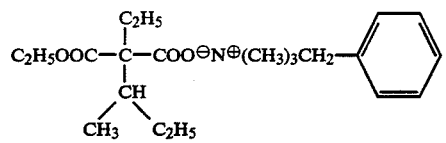

and in the form of a solution of about 57.6 percent by weight in methanol and the water formed by the neutralization.

(b) Using the same procedure and ingredients as described above except that α-ethyl-α-isobutylmalonic acid was added instead, until the color of the solution just turned to yellow, there was produced α-ethyl-α-isobutylmalonic acid mono trimethylbenzylammonium salt in accordance with the present invention having the following formula in accordance with (Ia) above

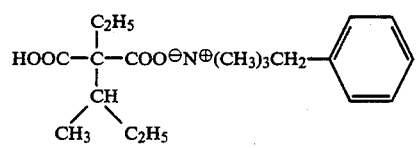

and in the form of a solution of about 55.7 percent by weight in methanol and the water formed by the neutralization.

(c) Using the same procedure and ingredients as described above except that 2-ethyl-2-[(phenylamino)carbonyl]butanoic acid was added instead, until the color of the solution just turned yellow there was produced trimethylbenzylammonium 2-ethyl-2-[(phenylamino)- carbonyl]butanoate in accordance with the present invention having the following formula in accordance with (IIa) above

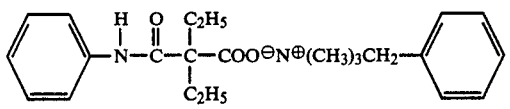

and in the form of a solution of about 58.9 percent by weight in methanol and the water formed by the neutralization.

(d) Using the same procedure and ingredients as described above except that 2-ethyl-2-[(phenylamino)carbonyl]hexanoic acid was added instead, until the color of the solution just turned yellow there was produced trimethylbenzylammonium 2-ethyl-2-[(phenylamino)carbonyl]hexanoate in accordance with the present invention having the following formula in accordance with (IIa) above

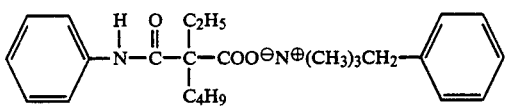

and in the form of a solution of about 60.5 percent by weight in methanol and the water formed by the neutralization.

The solution was concentrated in a rotary evaporator at a temperature of about 40° to 50° C. under a pressure of about 15 mm. of mercury to provide a solution of about 85 percent by weight of the salt.

(e) Using the same procedure and ingredients as described above except that triphenylacetic acid was added instead, and, heating the methanol solution to facilitate dissolution of the acid, there was produced trimethylbenzylammonium triphenylacetate in accordance with the present invention having the following formula in accordance with (IIIa) above

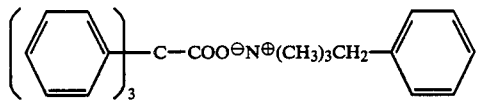

and in the form of a solution of about 61.9 percent by weight in methanol and the water formed by the neutralization.

The solution upon standing precipitated some free acid and the solution color turned to green indicating a shift in equilibrium back to free acid and its precipitation. However, upon slight warming the solid redissolved and the solution regained its yellow neutral color.

EXAMPLE 2

The following data in Table I sets forth a comparison of reactivities of a number of trimerization catalysts to be used in accordance with the present invention (Runs 1, 2, 6, 7, 8 and 11) with catalysts not in accordance with the present invention (Runs 3 to 5, 9, 10, and 12 to 14). The reactivity being measured was the elapsed time between mixing the catalyst with an isocyanate and the initiation of the trimerization reaction. The catalysts used in accordance with the present process were the (1a) to (1e) samples set forth in Example 1, and potassium 2-ethyl-2-[(phenylamino)carbonyl]hexanoate. In Run 15 trimerization reactions in accordance with the present invention were carried out using catalyst (1d) at four different activation temperatures.

A standardized procedure was employed throughout the runs wherein a 3 g. sample of purified (distilled) phenyl isocyanate was placed in a small glass jar followed by the specified catalyst at a concentration of about 0.2 mole percent based on the isocyanate. The liquid ingredients were stirred thoroughly with a stirring rod and allowed to stand at room temperature (about 20° C.) and observed for any signs of reaction.

For the catalysts not in accordance with the invention, the times in which the trimerization initiated after mixing were all in a matter of minutes. At the specified times, the liquid began to slowly exotherm with the exotherm temperature varying according to the catalyst employed followed by the solidification of the phenyl isocyanate to triphenyl isocyanurate the structure of which was confirmed by nuclear magnetic resonance spectrum analysis.

For the catalysts in accordance with the invention, induction times greater than 1 hour were observed and at the times specified the trimerization reaction initiated in a matter of seconds with an exotherm temperature reaching 160° C. at times and followed by almost immediate solidification of the mixture to triphenyl isocyanurate.

Runs 3 to 5 can be compared to Run 1 or 2 because the catalysts in the former runs are closely related to those in 1 and 2. It is noteworthy that by simply varying the catalyst to have only straight chain alkyl substituents (Run 3), the di-salt (Run 4), or a di-salt in accordance with U.S. Pat. No. 4,186,255 (Run 5), the induction times are reduced to levels well below those called for by the present process.

Similarly, the catalysts in Runs 9 and 10 are related in structure to those of Runs 6, 7, 8 but show a vastly different reaction profile from one group to the other.

Also, in the same way Runs 12 to 14 are related to Run 11 but again a vastly different reaction profile was observed.

Using the same procedure outlined above for the test comparisons, Run 15 consisted of four separate samples of phenyl isocyanate each of which were prepared with the catalyst (1d) at the 0.2 mole percent level. Each jar containing the ingredients was placed in an oil bath which was heated to the temperature specified in Table I while the contents were stirred with a thermometer. The time was recorded when trimerization initiated after the ingredients had reached the respective bath temperature. The reactions in all cases were very rapid with immediate exotherms to about 160° C. and almost immediate solidification of phenyl isocyanate to the phenyl isocyanurate trimer.

TABLE I

| Run No. | Catalyst | Induction Time |
|---|---|---|
| 1 | 1a | >8 hours |
| 2 | 1b | 2.5 hours |
| 3 | α,α-diethylmalonic acid mono trimethylbenzylammonium salt | 25 minutes |
| 4 | α,α-diethylmalonic acid di-[trimethylbenzylammonium salt] | 10 minutes |
| 5 | α,α-diethylmalonic acid di-[triethyl-(2-hydroxypropyl) ammonium salt] | 2 minutes |
| 6 | 1c | >8 hours |

TABLE I-continued

| Run No. | Catalyst | Induction Time |
|---|---|---|
| 7 | 1d | >8 hours |
| 8 | potassium 2-ethyl-2-[(phenylamino)carbonyl]hexanoate | >4 hours |
| 9 | trimethylbenzylammonium 2-ethyl-2-[(phenylamino)carbonyl]monothiohexanoate | 5 minutes |
| 10 | trimethylbenzylammonium 2-methyl-2-[(dodecylamino)carbonyl]propionate | 20 minutes |
| 11 | 1e | 4 hours |
| 12 | trimethylbenzylammonium 2-ethyl-hexanoate | 2 minutes |
| 13 | trimethylbenzylammonium 2,2-dimethyloctanoate | 9 minutes |
| 14 | trimethylbenzylammonium benzilate | 17 minutes |
| 15 | 1d | 30 seconds (100° C.) 3.5 minutes (80° C.) 11.25 minutes (65° C.) 41 minutes (55° C.) |

EXAMPLE 3

The following experiments set forth two trimerization reactions in accordance with the present invention of a liquefied polyisocyanate, one in the absence, and, the second in the presence of an organic polyol.

The polyisocyanate was a modified liquid methylenebis(phenyl isocyanate) (MDI) obtained by treating an MDI comprised of about 94 percent by weignt of the 4,4′-isomer and 6 percent of the 2,4-isomer in accordance with U.S. Pat. No. 3,384,653 to form carbodiimide groups; I.E.=143.7.

In the first reaction, 100 g. of the above polyisocyanate was weighed into an open aluminum pan and 1 g. of a methanolic solution of trimethylbenzylammonium 2-ethyl-2-[(phenylamino)carbonyl]hexanoate (about 60.5 percent by weight) was thoroughly mixed in using a thermometer as a stirrer. The temperature immediately rose from 20° C. to 25° C. and a very small amount of solids precipitated but neither the temperature rose any more nor did any more solids precipitate. The polyisocyanate stood for about 6 hours and 5 minutes at 20° C. before trimerization began and the mixture thickened. The viscous plaque material was cured at 100° C. for 5 minutes causing a moderate amount of foaming which was due to the evolution of carbon dioxide from polycarbodiimide formation.

In the second reaction, 144 g. of the above isocyanate was thoroughly blended with 40 g. of a polyethyleneoxypolypropyleneoxy diol having an equivalent weight of 1000, and 1.8 g. of the catalyst solution. The addition of the catalyst caused an initial exotherm to 36° C. and an initial viscosity increase both of which were believed to be due to urethane prepolymer formation. The system cooled back to 20° C. and was stable for greater than seven hours. Two separate samples of the mixture were cured, one at 100° C. in 3 minutes, and another at 150° C. in 2 minutes to form two solid polyisocyanurate plaques with little to no foaming observed. The polymer structure was confirmed by infrared analysis showing the isocyanurate linkages in both cases.

EXAMPLE 4

The following four trimerization reactions were carried out similarly to the above described experiments by weighing out samples of 3.0 g., 3.0 g., 3.3 g., and 3.3 g. of phenyl isocyanate into four separate small glass jars.

The first jar was mixed with 1 drop of the methanolic solution of trimethylbenzylammonium 2-ethyl-2-[(phenylamino)carbonyl]butanoate (at about 60.5 percent by weight) and heated to 70° C. whereupon after 9 minutes the reactants turned solid in a few seconds.

To the second, third, and fourth jars there was added 0.6 g., 0.3 g., and 0.1 g. respectively of the monoethylether of diethylene glycol along with 1 drop of the catalyst solution. The three jars were heated to 100° C. and after about 35 seconds their contents solidified.

Infrared analysis of the four solid samples showed that product from the first jar had the predominant absorption at 1700 cm$^{-1}$ for isocyanurate groups along with a minor absorption at 2130 and 2100 cm$^{-1}$ for carbodiimide linkages. It should be noted that this infrared absorption spectrum was virtually identical to the spectrum of the product from the same reactants but heated to 100° C.

The second jar had no discernible carbodiimide linkages but only isocyanurate and urethane. The last two jars had only small amounts of carbodiimide detectable by infrared absorption.

The presence of hydroxyl groups to co-react with the isocyanate obviously suppresses the formation of carbodiimide.

In a similar experiment to the one described above but using polyfunctional ingredients, four samples of 5.4 g., 5.8 g., 5.6 g., and 6.3 g., of pure 4,4′-methylenebis(phenyl isocyanate) were reacted at 100° C. with 1.0 g., 2.0 g., 2.5 g., and 3.5 g. respectively of Poly G 55-112 (a polyethyleneoxy-polypropyleneoxy diol of 500 hydroxyl eq. wt.; supplied by Olin Chemical Corp., New Haven, Conn.) in the presence of 2 drops each of the above catalyst solution.

The first sample containing the 1 g. of polyol showed significant foaming during the polymerization. Foaming was only borderline in the second sample. The third and fourth samples showed only slight bubble formation in the final solidified polymer pieces with no appreciable difference between the two.

In the absence of polyols, the polymer obtained was a polyisocyanurate containing a minor amount of polycarbodiimide whereas in the presence of an appreciable polyol concentration the polycarbodiimide was not formed to any extent.

I claim:

1. A thermally activable organic isocyanate trimerization catalyst comprising a carboxylic acid salt selected from the group consisting of the following formulae

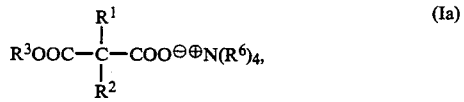

(Ia)

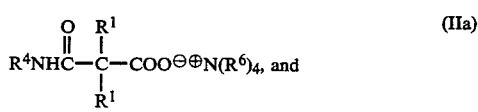

(IIa)

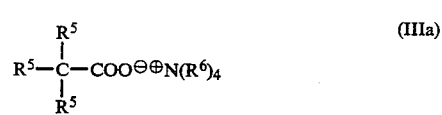

(IIIa)

wherein R$^1$ in (Ia) is alkyl having 2 to 8 carbon atoms, inclusive, and each R$^1$ in (IIa) is independently selected from alkyl having 2 to 8 carbon atoms, inclusive, $R^2$ is a highly branched alkyl having 3 to 8 carbon atoms, inclusive, $R^3$ is selected from the group consisting of hydrogen, alkyl and aryl, $R^4$ is selected from the group consisting of alkyl, aryl, aralkyl, and cycloalkyl, each $R^5$ is independently selected from aryl, and wherein each one of the four $R^6$ radicals is independently selected from the group consisting of alkyl, aralkyl, cycloalkyl, and radicals having the formula $$-\!\!\!-\!\!(CH_2CH-\!\!O)_{\overline{n}}H \qquad (IV)$$
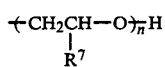

wherein $R^7$ is selected from the group consisting of hydrogen and methyl and n is a number of from 1 to 4 provided that no more than one $R^6$ radical has the formula (IV).

2. A salt according to claim 1 having the formula (Ia).

3. A salt according to claim 2 having the formula

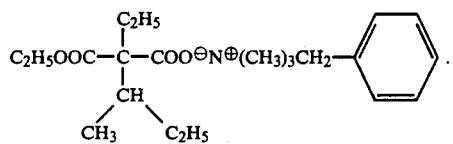

4. A salt according to claim 1 having the formula (IIa).

5. A salt according to claim 4 having the formula

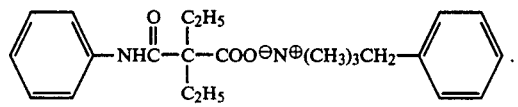

6. A salt according to claim 4 having the formula

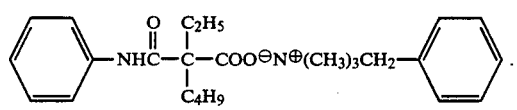

7. A salt according to claim 1 having the formula (IIIa).

8. A salt according to claim 7 having the formula

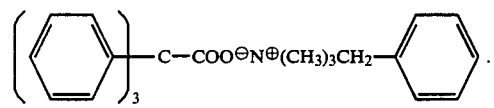

* * * * *